United States Patent [19]
Kiel et al.

[11] Patent Number: 5,627,932
[45] Date of Patent: May 6, 1997

[54] REDUCED DIAMETER INDOOR FIBER OPTIC CABLE

[75] Inventors: David H. Kiel, Conover; Keith D. Church, Winston-Salem, both of N.C.

[73] Assignee: Siecor Corporation, Hickory, N.C.

[21] Appl. No.: 518,211

[22] Filed: Aug. 23, 1995

[51] Int. Cl.$^6$ .................................................. G02B 6/44
[52] U.S. Cl. .................................... 385/102; 385/107
[58] Field of Search .................................... 385/100, 102, 385/106–108, 109, 112, 113

[56] References Cited

U.S. PATENT DOCUMENTS

| | | | |
|---|---|---|---|
| 4,787,702 | 11/1988 | Khalil | 385/102 |
| 4,818,060 | 4/1989 | Arroyo | 385/107 X |
| 5,016,973 | 5/1991 | Hager et al. | 385/102 |
| 5,148,509 | 9/1992 | Kannabiran | 385/109 |
| 5,259,055 | 11/1993 | Cowen et al. | 385/100 |
| 5,345,525 | 9/1994 | Holman et al. | 385/106 X |

OTHER PUBLICATIONS

Miniature Optical Fiber Cables for Jumper Applications, 1994 International Wire & Cable Symposium Proceedings pp. 183–188 (No Month).

Premises Fiber Optic Products Catalog, (5th Edition), Siecor Corporation 1994 pp. 1–38 to 1–40 (No Month).

Siecor Corporation publication MG–1, 1985, 2 pgs (No Month).

Designer Guide to Fiber Optics p. 44, AMP, Inc., 1982 (No Month).

*Primary Examiner*—John D. Lee
*Attorney, Agent, or Firm*—J. David Abernethy

[57] ABSTRACT

Tight buffered optical fiber cables for indoor use as jumper or interconnect cables have a reduced outer diameter and nonetheless pass many recognized mechanical and environmental test procedures. A single optical fiber cable has an outer diameter of equal to or less than 1500 µm, and a dual optical fiber cable has an outer diameter of equal to or less than 2000 µm. A layer of loose tensile strength yarn is disposed between the tight buffered optical fiber or optical fibers and the outer jacket. The cables may be made of flame retardant materials for riser or plenum applications.

20 Claims, 4 Drawing Sheets

REDUCED DIAMETER INDOOR FIBER OPTIC CABLE

BACKGROUND OF THE INVENTION

This invention relates to small diameter optical waveguide fiber interconnect cables for indoor use containing single or dual tight buffered optical fibers.

Optical waveguide fibers are normally provided with a plastic protective coating applied by the fiber manufacturer directly over the cladding in order to protect the fiber. Such fibers are specified by an expression x/y, in which x is the outer diameter of the cladding and y is the outer diameter of the manufacturer applied coating or coatings.

In tight buffered cables, a protective tube is applied by the cable manufacturer directly to the outer surface of the fiber coating applied by the fiber manufacturer so that the fiber and the tube are in contact along substantially their length. In loose tube or composite buffer constructions, the coated optical fiber is separated from the protective tube.

Single and dual tight buffered optical waveguide fiber cables for the interconnection of equipment located indoors have been designed for voice, data, video, and imaging transmission in computer, process control, data entry, and wired office systems. These cables comprise a layer of loose aramid fiber tensile strength members disposed between either one or two tight buffered optical fibers and a surrounding outer plastic jacket. Such cables have been used as jumpers in distribution networks located within buildings. Such cables have also been available in plenum and riser rated versions. An example is Siecor Corporation's DIB® cable, which may be used for interface to FDDI and ESCON compatible connectors. Such cables have been available with single-mode, 50/125 µm, 62.5/125 µm, and 100/140 µm multimode optical waveguide fibers. The cable outside diameter of a single fiber cable has typically been 2.9 mm, and the cable outside diameter of a dual fiber cable has been 4.8 mm.

Although the prior art cables have met industry needs, there are some applications in which space is at a premium. In large buildings, numerous fibers may be carried by a single duct or plenum and a multitude of jumpers may be connectorized in a single cross-connect cabinet. The cabinets are themselves designed to accommodate the size of the jumpers, and a reduction in the outer diameter of the jumpers would advantageously allow for a reduction in size of the cabinets. For these reasons, a further reduction in diameter of the cables would allow greater packing density of the fibers. However, such cables would still be expected to meet most of the specifications which are met by the cables that are currently available.

AT&T's minicord design provides a single fiber cable having an outer diameter of 1.60 mm. The cable meets a number of specifications listed in Bellcore publication GR-409.

SUMMARY OF THE INVENTION

In view of the foregoing state of the art, it is therefore an object of the present invention to provide optical waveguide fiber interconnect cables for indoor use containing tight buffered optical fibers which offer a still further reduction in cable outer diameter while passing the same test qualifications met by somewhat larger cables previously made available to the market.

Another object of the invention is to provide a dual fiber interconnect cable of reduced outer diameter in which both optical fibers are axially disposed.

These and other objects are provided, according to the present invention, by providing an optical fiber cable comprising a single optical waveguide fiber having an outer coating, said outer coating having a diameter of about 500 µm; a layer of loose tensile fibers surrounding the optical waveguide fiber outer coating; and, a jacket of plastic material having an outer diameter $D_2$ surrounding the layer of loose tensile fibers, $D_2$ not exceeding about 1500 µm. In certain preferred embodiments of the invention, $D_2$ does not exceed about 1400 µm, or in some cases about 1200 µm.

Another optical fiber cable according to the invention comprises two optical waveguide fibers each having an outer coating, each said outer coating having a diameter of about 500 µm; a layer of loose tensile fibers surrounding the coated optical waveguide fibers; and, a jacket of plastic material having an outer diameter $D_2$ surrounding the layer of loose tensile fibers, $D_2$ not exceeding about 2000 µm. In certain preferred embodiments of the invention, $D_2$ does not exceed about 1800 µm, or in some cases about 1600 µm.

The optical waveguide cable outer jacket may be formed of flame-retardant and low-smoke producing material in order to meet riser or plenum specifications.

The outer coating of each optical waveguide fiber in a preferred embodiment is made of plastic material or materials having a Shore 15 seconds hardness rating of at least about 58 on the D scale, and the cable jacket is made of plastic material having a Shore 15 seconds hardness rating of at least about 67 on the C scale. The cable according to the invention may contain no gel-like water-blocking compounds.

The accompanying drawings, which are incorporated in and constitute part of the specification, illustrate the preferred embodiments of the invention, and together with the description, serve to explain the principles of the invention. It is to be understood, of course, that both the drawings and the description are explanatory only and are not restrictive of the invention. Like numbers refer to like elements throughout. The drawings are not necessarily drawn to scale but are configured to clearly illustrate the invention.

DETAILED DESCRIPTION OF THE INVENTION

Figure 1:
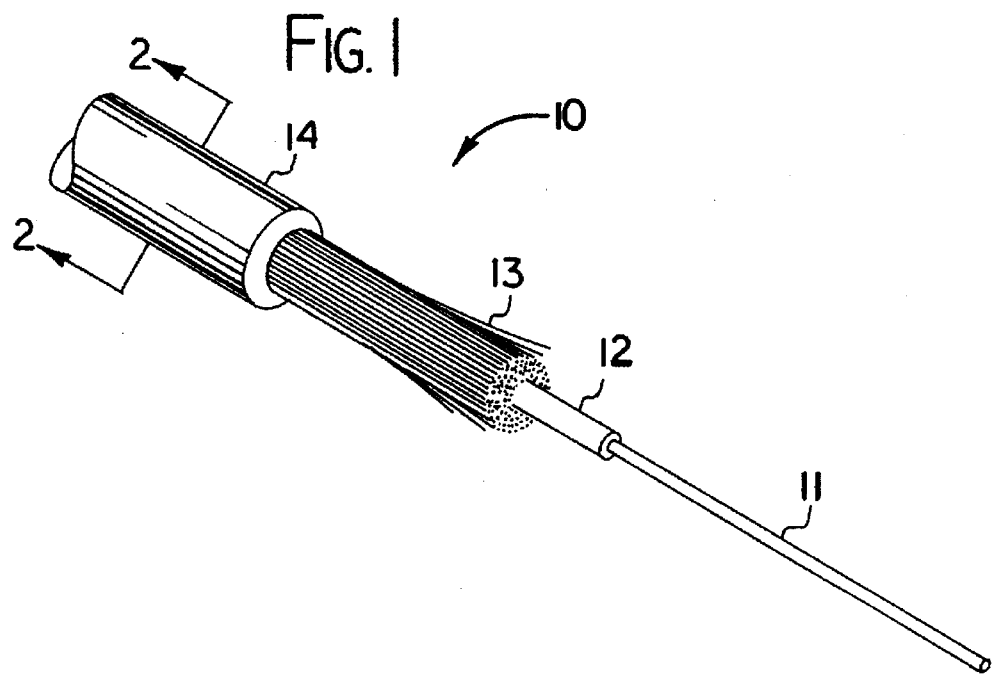
FIG. 1 is an isometric cut back view of a single optical fiber cable.
Figure 2:
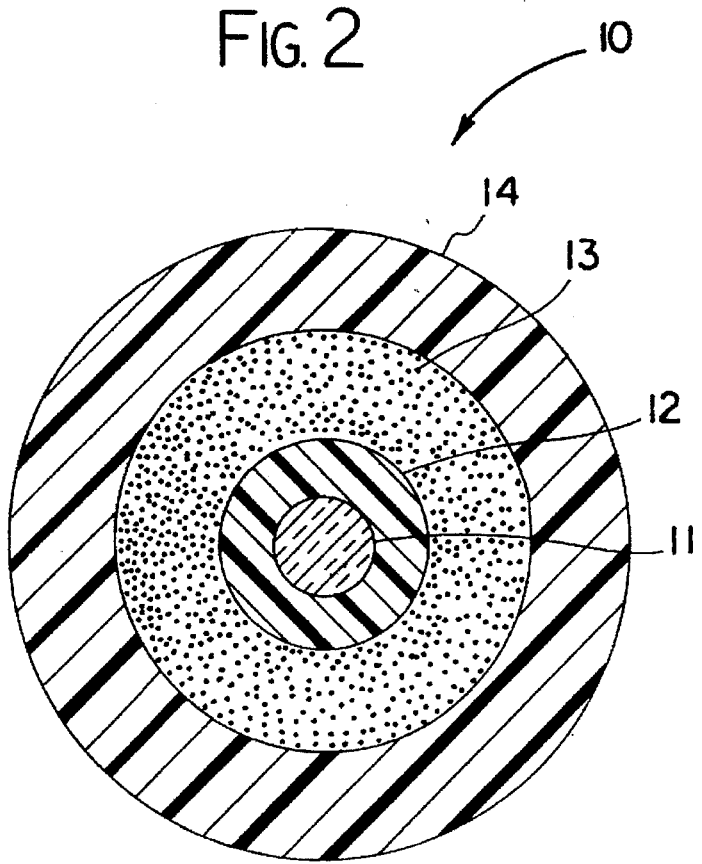
FIG. 2 a cross-sectional view of the cable along line 2—2 of FIG. 1.

A single optical fiber cable 10 according to the invention may be constructed as shown in FIGS. 1 and 2. Cable 10 contains an optical fiber 11 surrounded by a coating 12 applied directly over the optical fiber 11. Optical fiber 11 may contain a core and a cladding surrounding the core, with one or more polymer coatings applied over the cladding to an outer diameter of 250 µm. Coating 12 may have an outer diameter of 500 µm. In a preferred embodiment, coating 12 is formed of a polyvinyl chloride (PVC) material.

A layer 13 of loose tensile strength members is then applied over buffered optical fiber 11,12 and an outer polymer tubular jacket 14 is extruded over layer 13. Outer jacket 14 may be formed of PVC material. To achieve the reduced size of cable 10, jacket 14 has an outer diameter not exceeding 1500 µm. More preferably, jacket 14 has an outer diameter of about 1400 µm, and may be constructed to have an outer diameter not exceeding about 1200 µm. In a preferred embodiment, where the outer diameter of jacket 14 is $D_2$ and the inner diameter of jacket 14 is $D_2$, ($D_1-D_1$) should be less than or equal to about 300 µm, and in a preferred embodiment is about 200 µm.

Figure 3:
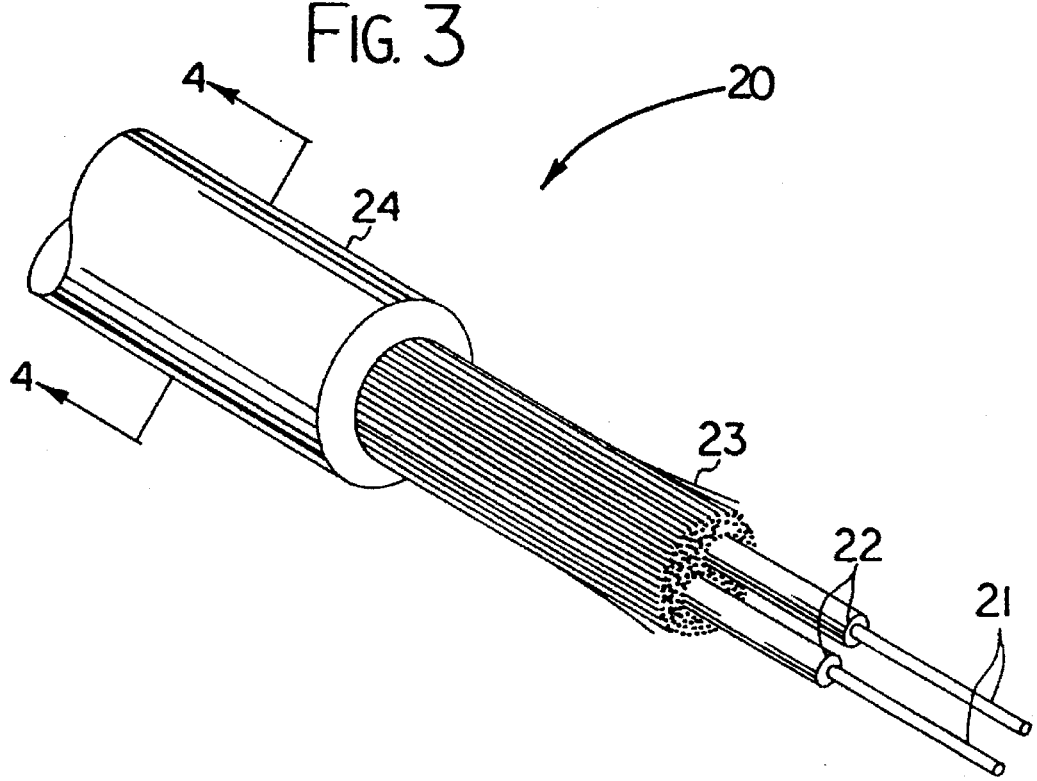
FIG. 3 is an isometric cut back view of a dual optical fiber cable.
Figure 4:
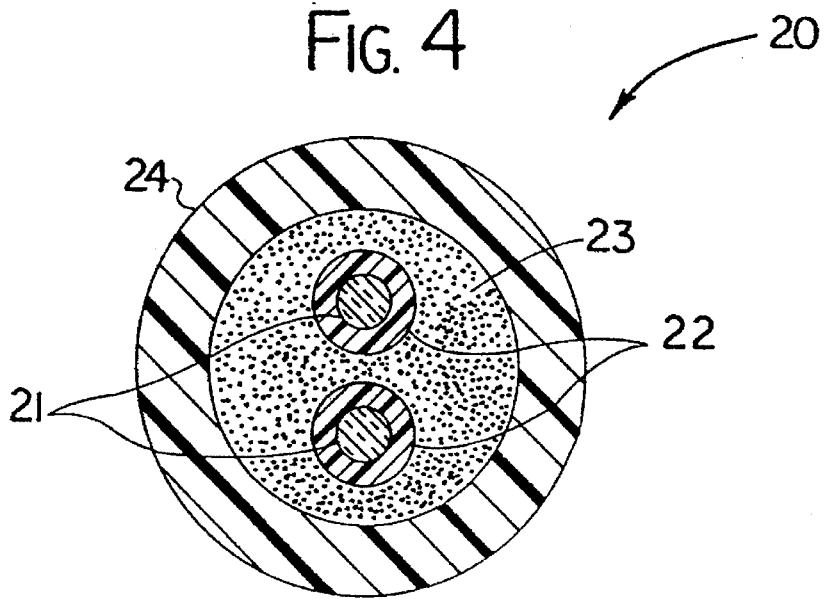
FIG. 4 is a cross-sectional view of the cable along line 4—4 of FIG. 3.

A dual optical fiber cable 20 according to the invention is shown in FIGS. 3 and 4. Each optical fiber 21 may contain a core and a cladding surrounding the core, with one or more polymer coatings applied over the cladding to an outer diameter of 250 µm. Coating 22 may be formed of PVC material and may have an outer diameter of 500 µm. A layer 23 of loose tensile strength yarns such as Kevlar aramid fibers is twisted around the buffered optical fibers to an outer diameter of about 1.30 mm, and outer tubular jacket 24 of plastic material having an outer diameter not exceeding 2000 µm surrounds layer 23. Outer jacket 24 may be provided to have an outer diameter not exceeding 1800 µm or 1600 µm in certain applications. Outer jacket 24 may be formed of PVC material.

Figure 5:
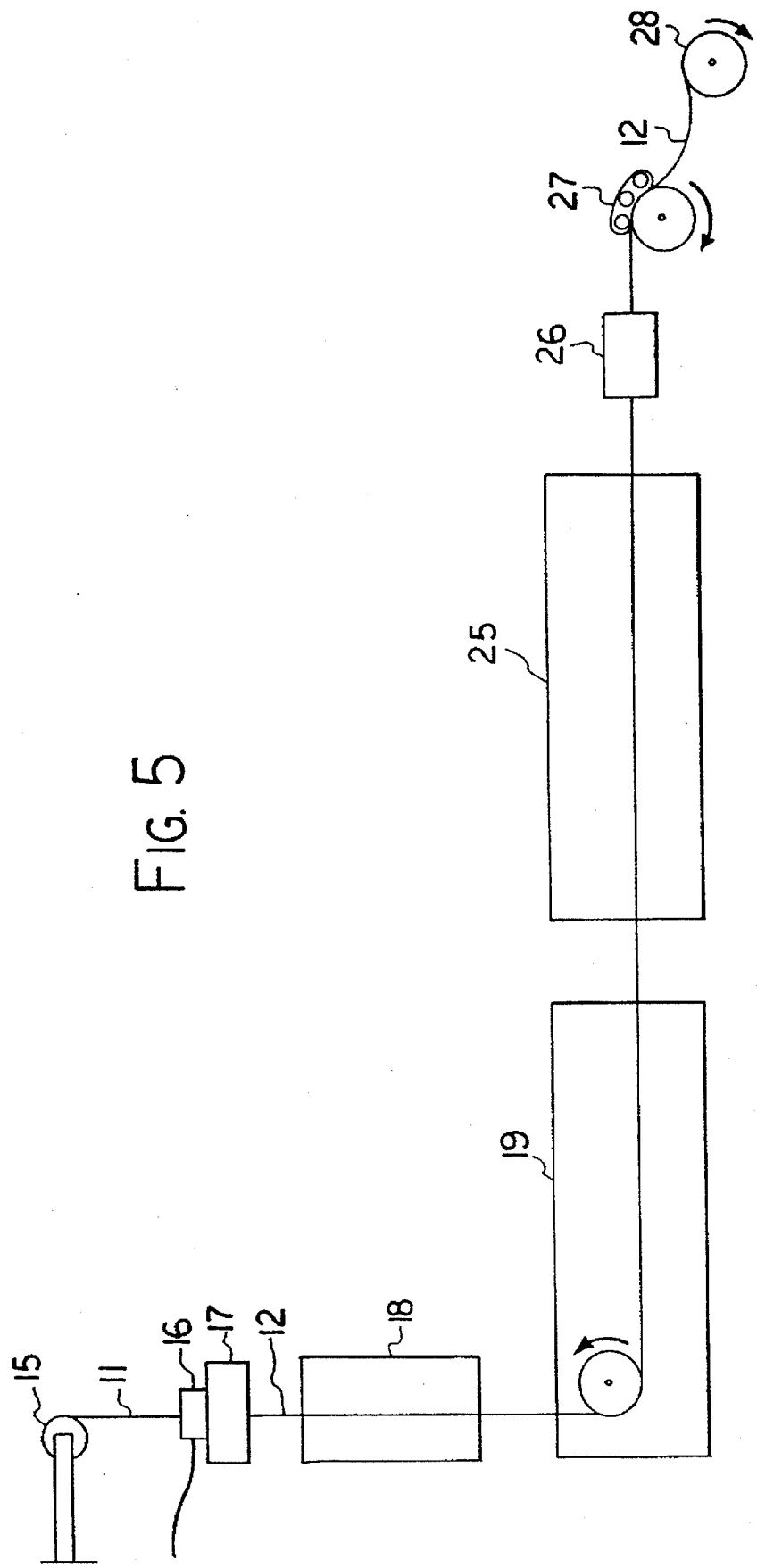
FIG. 5 is a schematic view of an optical fiber buffering line.

An example of a buffering line for applying coatings 12 to fibers 11 or coatings 22 to fibers 21 is shown in FIG. 5. An optical fiber 11 is payed off from spool 15 and is pulled downward through a vacuum device 16 and extruder 17. Coating 12 is applied over optical fiber 21 by extruder 17, which may have a tip diameter of 1.65 mm. Vacuum device 16 applies a partial vacuum of around 7 inches Hg through the tip of extruder 17 to tightly draw coating 12 around optical fiber 11 in a uniform thickness.

Optical fiber 11 with coating 12 thereon then proceeds through a first vertical water trough 18 and two horizontal water troughs 19 and 25. The water temperature in troughs 18 and 19 is maintained at around 40° C., while the water temperature in trough 25 is maintained at around 25° C. Buffered optical fiber 11,12 then passes through dimensional measurement device 26, is drawn through a partial turn around drawing device 27, and is wound around spool 28.

Figure 6:
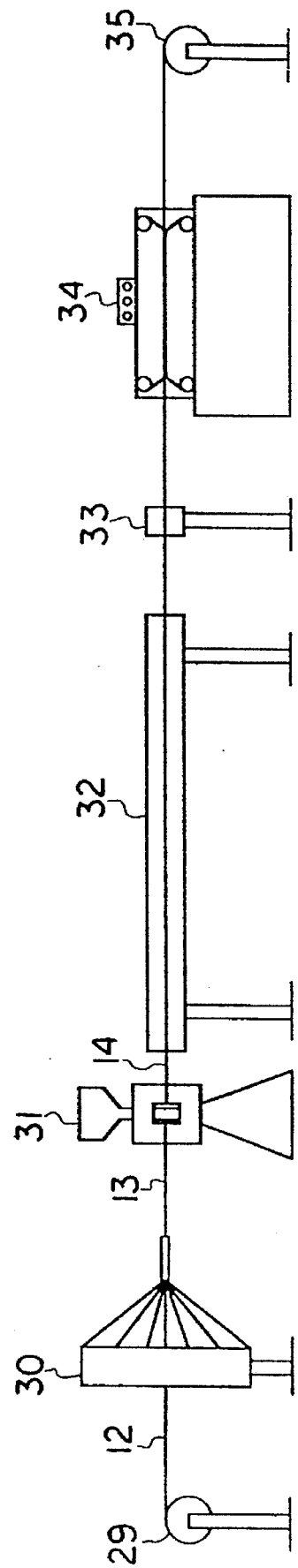
FIG. 6 is a schematic view of an optical cable jacketing line.

An example of a jacketing line which may be used to complete the manufacture of cables according to the invention is seen in FIG. 6. Buffered optical fiber 11,12 is payed off from payoff 29. If a dual fiber cable is to be made, then another payoff containing another buffered optical fiber is used. The buffered optical fiber or optical fibers then are drawn through a spinning device 30, which twists a uniform layer 13 of loose tensile strength members, such as Kevlar aramid fiber yarns, around the buffered optical fiber or optical fibers. Ten 380 denier Kevlar yarns may be used. The extruder 31 then extrudes a plastic material forming outer jacket 14 around the layer 13 of strength members. For a single fiber cable, a tip diameter of 1.2 mm and a die diameter of 1.8 mm may be used, while for the dual fiber cable a tip diameter of 1.35 mm and a die diameter of 2.75 mm may be used. The jacket 14 is then cooled in water trough 32, and forced air device 33 removes remaining water from jacket 14. The cable is then drawn through a pulling device 34 at a tension of about 200 grams and onto takeup reel 35.

If a cable according to the invention is to be installed in a plenum or riser application, the cable outer jacket 24 is formed of flame-retardant material. To further enhance flame retardance, the cables 10 and 20 contain no gel-like compounds. The cables may then be suitable for riser or plenum applications. In certain applications, the user may wish to avoid the use of halogenated materials such as PVC and leaded additives, which are sometimes used as a heat stabilizers in plasticizers. A completely lead and halogen free cable may be made by forming outer buffer coating 12 or 22 of Hytrel or radiation-curable acrylate material and forming outer jacket 14 or 24 of a flame-retardant polyethylene.

The optical waveguide fiber outer buffer coating 12 or 22 is made of plastic material having a Shore 15 seconds hardness rating of at least about 58 on the D scale or a Shore 15 seconds hardness rating of at least about 67 on the C scale. A preferred hardness rating for coating 12 or 22 is 70 on the D scale and 91 on the C scale, as so defined.

A preferred Shore 15 seconds hardness rating of the cable outer jacket 14 or 24 is 69 on the C scale and 91 on the A scale, and its minimum preferred Shore 15 seconds hardness rating on the C scale is about 67. Both the outer buffer coating 12 or 22 and the outer jacket 14 or 24 may be made of polyvinyl chloride plastic material. Another material which may be used for the outer jacket is polyvinylidene fluoride, and an alternate material for the outer buffer coating 12 or 22 is a ultraviolet light cured acrylate material.

The relatively hard coating 12 or 22 and outer jacket 14 or 24 enables the cables according to the invention to pass a variety of industry test standards for indoor cables. Results for cables having an outer diameter of about 1400 µm are shown in Table 1 below.

TABLE 1

Mechanical and environmental testing results for single fiber cables

| Test procedure requirement | Result |
| --- | --- |
| Bellcore GR-409 Impact | pass |
| Bellcore GR-409 Tensile | pass |
| Bellcore GR-409 Twist | pass |
| Bellcore GR-409 Cyclic Flexing | pass |
| Bellcore GR-409 Hot Bend | pass |
| Bellcore GR-409 Cold Bend | pass |
| ANSI-596 Crush | pass |
| Bellcore GR-409 Temperature Cycling | pass |
| Bellcore GR-409 Cable Aging | pass |

It is to be understood that the invention is not limited to the exact details of the construction, operation, exact materials, or embodiments shown and described, as modifications and equivalents will be apparent to one skilled in the art without departing from the scope of the invention. As used herein, an expression such as "Shore 15 seconds hardness rating" means that the reading is to be taken after 15 seconds.

What is claimed is:

1. An optical fiber cable, comprising:
    a single optical waveguide fiber having an outer coating, said outer coating having a diameter of about 500 µm;
    a layer of loose tensile fibers surrounding the optical waveguide fiber outer coating; and,
    a tubular jacket of plastic material having an outer diameter $D_2$ surrounding the layer of loose tensile fibers, $D_2$ not exceeding about 1500 µm, said cable containing no gel-like compounds.

2. An optical fiber cable as set out in claim 1, wherein $D_2$ does not exceed about 1400 µm.

3. An optical fiber cable as set out in claim 1, wherein $D_2$ does not exceed about 1200 µm.

4. An optical fiber cable as set out in claim 1, wherein the optical fiber cable outer jacket is formed of flame-retardant material.

5. An optical fiber cable as set out in claim 1, wherein the optical waveguide fiber outer coating is made of plastic material having a Shore 15 seconds hardness rating of at least about 58 on the D scale.

6. An optical fiber cable as set out in claim 1, wherein the optical fiber cable jacket is made of plastic material having a Shore 15 seconds hardness rating of at least about 67 on the C scale.

7. An optical fiber cable as set out in claim 1, wherein the tubular jacket has an inner diameter $D_1$ and $(D_2-D_1)$ is less than or equal to about 300 µm.

8. An optical fiber cable as set out in claim 1 which contains no materials comprising halogen compounds.

9. An optical fiber cable as set out in claim 1 which contains no materials comprising leaded compounds.

10. An optical fiber cable, comprising:
   a single optical waveguide fiber having an outer coating, said outer coating having a diameter of about 500 µm;
   a layer of loose tensile fibers surrounding the optical waveguide fiber outer coating; and,
   a tubular jacket of plastic material having an outer diameter $D_2$ surrounding the layer of loose tensile fibers, $D_2$, not exceeding about 1500 µm, said cable passing the ANSI-596 Crush test.

11. An optical fiber cable, comprising:
   two optical waveguide fibers each having an outer coating, each said outer coating having a diameter of about 500 µm;
   a layer of loose tensile fibers surrounding the coated optical waveguide fibers; and,
   a tubular jacket of plastic material having an outer diameter $D_2$ surrounding the layer of loose tensile fibers, $D_2$ not exceeding about 2000 µm. said cable containing no gel-like compounds.

12. An optical fiber cable as set out in claim 11, wherein $D_2$ does not exceed about 1800 µm.

13. An optical fiber cable as set out in claim 11, wherein $D_2$ does not exceed about 1600 µm.

14. An optical fiber cable as set out in claim 11, wherein the optical fiber cable outer jacket is formed of flame-retardant material.

15. An optical fiber cable as set out in claim 11, wherein the optical waveguide fiber outer coatings are made of plastic material or materials having a Shore 15 seconds hardness rating of at least about 58 on the D scale.

16. An optical fiber cable as set out in claim 11, wherein the optical fiber cable jacket is made of plastic material having a Shore 15 seconds hardness rating of at least about 67 on the C scale.

17. An optical fiber cable as set out in claim 11 which contains no materials comprising halogen compounds.

18. An optical fiber cable as set out in claim 11 which contains no materials comprising leaded compounds.

19. An optical fiber cable as set out in claim 11, wherein the tubular jacket has an inner diameter $D_1$ and $(D_2-D_1)$ is less than or equal to about 300 µm.

20. An optical fiber cable, comprising:
   two optical waveguide fibers each having an outer coating, each said outer coating having a diameter of about 500 µm;
   a layer of loose tensile fibers surrounding the coated optical waveguide fibers; and,
   a tubular jacket of plastic material having an outer diameter $D_2$ surrounding the layer of loose tensile fibers, $D_2$ not exceeding about 2000 µm, said cable passing the ANSI-596 Crush test.

* * * * *